US011112263B2

(12) United States Patent
Timor et al.

(10) Patent No.: US 11,112,263 B2
(45) Date of Patent: Sep. 7, 2021

(54) INVENTORY QUANTITY PREDICTION FOR GEOSPATIAL ADS WITH TRIGGER PARAMETERS

(71) Applicant: GOOGLE LLC, Mountain View, CA (US)

(72) Inventors: Roy Timor, Tel-Aviv (IL); Marina Rave, Tel-Aviv (IL); Yoav Gal, Tel-Aviv (IL); Karin Zilberstein, Tel-Aviv (IL); Sagie Maoz, Tel-Aviv (IL); Tal Goldberg, Tel-Aviv (IL); Lital Goldhaber, Tel-Aviv (IL); Harel Gliksman, Tel-Aviv (IL); Elan Hami, Tel-Aviv (IL); Daniella Gutlansky, Tel-Aviv (IL); Oded Betzalel, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 94 days.

(21) Appl. No.: 15/774,925

(22) PCT Filed: Apr. 21, 2017

(86) PCT No.: PCT/US2017/028716
§ 371 (c)(1),
(2) Date: May 9, 2018

(87) PCT Pub. No.: WO2018/194632
PCT Pub. Date: Oct. 25, 2018

(65) Prior Publication Data
US 2021/0164798 A1 Jun. 3, 2021

(51) Int. Cl.
*G01C 21/36* (2006.01)
*G06N 7/00* (2006.01)

(52) U.S. Cl.
CPC ....... *G01C 21/367* (2013.01); *G01C 21/3617* (2013.01); *G06N 7/005* (2013.01)

(58) Field of Classification Search
CPC ................... G01C 21/367–3617; G06N 7/005
See application file for complete search history.

(56) References Cited

U.S. PATENT DOCUMENTS

| 8,589,069 B1 * | 11/2013 | Lehman | ................. | H04W 4/029 |
| | | | | 701/438 |
| 8,954,860 B1 * | 2/2015 | Hands | ................ | G01C 21/3682 |
| | | | | 715/738 |

(Continued)

OTHER PUBLICATIONS

European Examination Report for Application No. 17720971.5, dated Aug. 13, 2020.

(Continued)

*Primary Examiner* — Calvin Cheung
(74) *Attorney, Agent, or Firm* — Marshall, Gerstein & Borun LLP (57) ABSTRACT

To determine an impression metric for an organization, a server device generates a statistical model for estimating the impression metric using machine learning techniques. The server device obtains training data for the statistical model by randomly selecting geographic locations within a geographic area and determining the number of users eligible to receive a particular type of advertisement for each randomly selected geographic location. For example, a user may be deemed eligible when displaying the geographic location via a mapping application. When an organization requests an estimate of a number of impressions for an advertising campaign, the server device applies data included in the request (e.g., the time period for the advertising campaign, the number of organization locations, identifiers for the organization locations such as geographic coordinates or an (Continued)

address, etc.) to the statistical model to estimate an impression metric for the organization.

18 Claims, 5 Drawing Sheets

(56) References Cited

U.S. PATENT DOCUMENTS

| | | | |
|---|---|---|---|
| 9,031,861 B1 | 5/2015 | Liu et al. | |
| 9,697,476 B1* | 7/2017 | Prieditis | G06N 7/005 |
| 2006/0287810 A1* | 12/2006 | Sadri | G01C 21/20 |
| | | | 701/438 |
| 2007/0210937 A1 | 9/2007 | Smith et al. | |
| 2010/0010958 A1 | 1/2010 | Perrow et al. | |
| 2010/0088631 A1* | 4/2010 | Schiller | G06F 3/04817 |
| | | | 715/784 |
| 2010/0332315 A1* | 12/2010 | Kamar | G06Q 30/02 |
| | | | 705/14.46 |
| 2012/0220314 A1 | 8/2012 | Altman et al. | |
| 2013/0103697 A1* | 4/2013 | Hill | G06F 16/9537 |
| | | | 707/748 |
| 2013/0204706 A1 | 8/2013 | Tang et al. | |
| 2013/0268351 A1 | 10/2013 | Abraham et al. | |
| 2013/0332279 A1* | 12/2013 | Kuusela | H04W 4/02 |
| | | | 705/14.57 |
| 2014/0256357 A1* | 9/2014 | Wang | H04W 4/029 |
| | | | 455/456.3 |
| 2015/0019347 A1 | 1/2015 | Naghdy et al. | |
| 2015/0161271 A1* | 6/2015 | Gur | G06F 16/9537 |
| | | | 707/728 |
| 2015/0169605 A1* | 6/2015 | Kogan | G06F 16/90324 |
| | | | 707/737 |
| 2015/0339717 A1* | 11/2015 | Binas | G06Q 30/0261 |
| | | | 705/14.58 |
| 2016/0019465 A1* | 1/2016 | Milton | G06Q 30/0201 |
| | | | 706/52 |
| 2016/0048876 A1 | 2/2016 | Murphy et al. | |
| 2016/0057572 A1* | 2/2016 | Bojorquez Alfaro | |
| | | | H04W 12/06 |
| | | | 455/411 |
| 2017/0243107 A1* | 8/2017 | Jolley | G06N 5/02 |

OTHER PUBLICATIONS

International Preliminary Report on Patentability for Application No. PCT/US2017/028716, dated May 27, 2019.
Search Report for International application No. PCT/US2017/028716, dated Jul. 14, 2017.
Written Opinion for International application No. PCT/US2017/028716, dated Jul. 14, 2017.

* cited by examiner

| User ID | Session ID | Location | Zoom Level | Time | Route Data | User Interest Categories | Speed (mph) |
|---|---|---|---|---|---|---|---|
| 112345 | 23 | (0,0,2,3,1,2,3,3) | 8 | 2:30 pm | to Home, 23 miles | Cars | 0 |
| 11111 | 11 | (0,0,2,3,1,2,3) | 7 | 9:30 am | to Work, 2 miles | Sports | 15 |
| 55333 | 55 | (0,2,2,3,1,3,3,0) | 8 | 11:00 pm | 5.4 miles | Movies | 0 |
| 12654 | 99 | (1,0,3,3,1,2) | 6 | 1:15 pm | to Home, 2 miles | | 30 |
| 99256 | 57 | (0,1,2,0,1,3) | 6 | 3:00 pm | 3.6 miles | | 60 |
| 23659 | 38 | (0,1,1,1,1,2,0,2) | 8 | 7:10 am | 40 miles | | 0 |

FIG. 2A

| Location | Radius (mi) | Population | Traffic |
|---|---|---|---|
| (0,0,2,3,1,2,3,3) | 10 | 10 Thousand | Heavy |
| (0,0,2,3,1,2,3) | 50 | 50 Thousand | Light |
| (1,0,3,3,1,2) | 100 | 1 million | Moderate |

INVENTORY QUANTITY PREDICTION FOR GEOSPATIAL ADS WITH TRIGGER PARAMETERS

FIELD OF THE DISCLOSURE

The present disclosure relates to displaying impression data and, more particularly, to estimating the number of impressions of data or identifiers to be displayed representing an organization over a particular time period, to estimate a number of such impressions or identifiers that an organization will need to obtain for its locations.

BACKGROUND

Today, digital maps of geographic areas are displayed on computing devices, such as computers, tablets, and mobile phones via mapping applications, web browsers, etc. Many mapping applications display points of interest (POIs), such as businesses or other organizations on the map. Each POI may be displayed using an icon or other indicator of the type of POI (e.g., a restaurant symbol for restaurants, a shopping symbol for department stores, etc.).

Additionally, the mapping applications may include content items that include graphical as well as media content (static or dynamic images representing certain locations, advertisements, etc.) for some organizations at corresponding locations on the map. Currently, mapping applications allow an organization to display an identifier for their place(s) of business when a user is in the vicinity of a location associated with the organization (organization location). For a potential organization that requests an estimation of impressions for a particular type of content item that can act as a location based identifier (branded pin or advertisement banner), a prediction of the number of impressions for the particular type of content item is determined on a case-by-case basis.

The existing systems do not factor in geometries of the organization locations nor do they utilize historical data for similar location-based features to determine an impression estimate. Thus, the current systems are inaccurate. Additionally, existing systems do not periodically update their prediction criteria and therefore, the estimates can be outdated.

Accordingly, there is a need for determining an impression metric in real-time (or at least near real-time) based on one or more location-based features, where the system is capable of supporting massive amounts of location geometries.

SUMMARY

To determine an impression metric for an organization, an impression generation system creates a statistical model of impression data using machine learning techniques. The statistical model is generated by randomly selecting locations within a geographic area ("fake locations") and determining the number of users who would be exposed to a feature identifying or associated with the organization, such as a location based pin or advertisement banner at the fake location based on certain impression eligibility requirements. More specifically, an impression is generated when a user is exposed to a certain type of displayed content such as a branded pin or advertisement banner corresponding to the location of the organization (also referred to herein as a "takeover" or "takeover content item"). Accordingly, the impression generation system may determine separate impression metrics for branded pins and for advertisement banners.

Figure 1A:
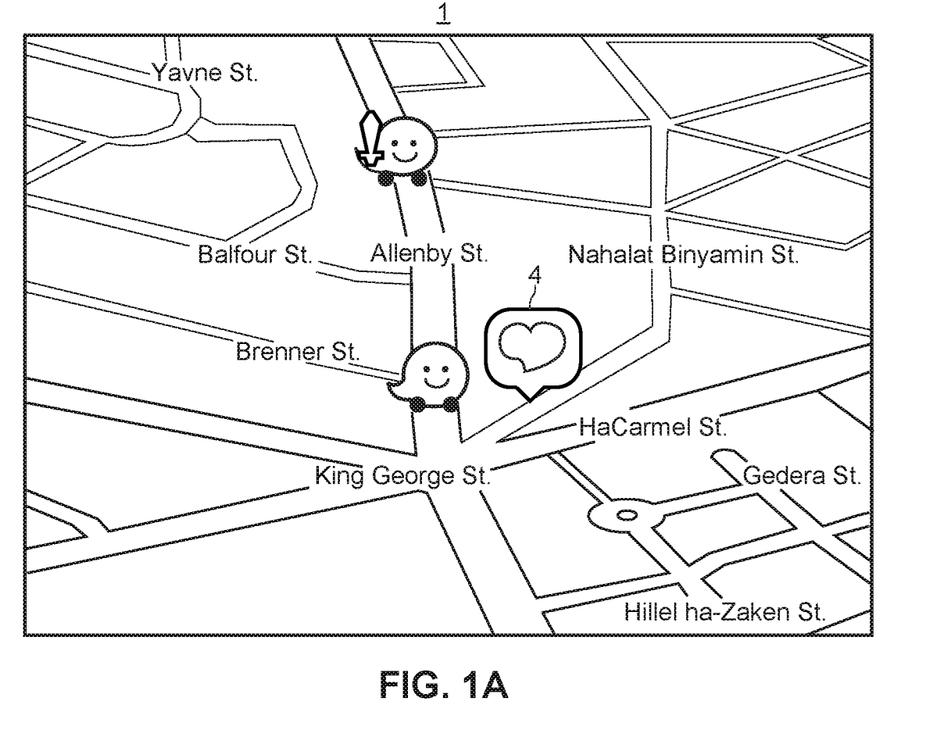
FIG. 1A is an example branded pin presented on a map display of a mapping application.

The user may be exposed to a branded pin when the user is displaying a mapping application and is within a threshold distance of an organization location, such that the organization location is presented on the mapping application. An example branded pin 4 is shown within a map display 1 of FIG. 1A. The branded pin 4 may be placed at the location of a corresponding organization and the branded pin 4 may display a logo or other symbol indicative of the organization. In this manner, users may identify the organization when viewing the branded pin 4.

Figure 1B:
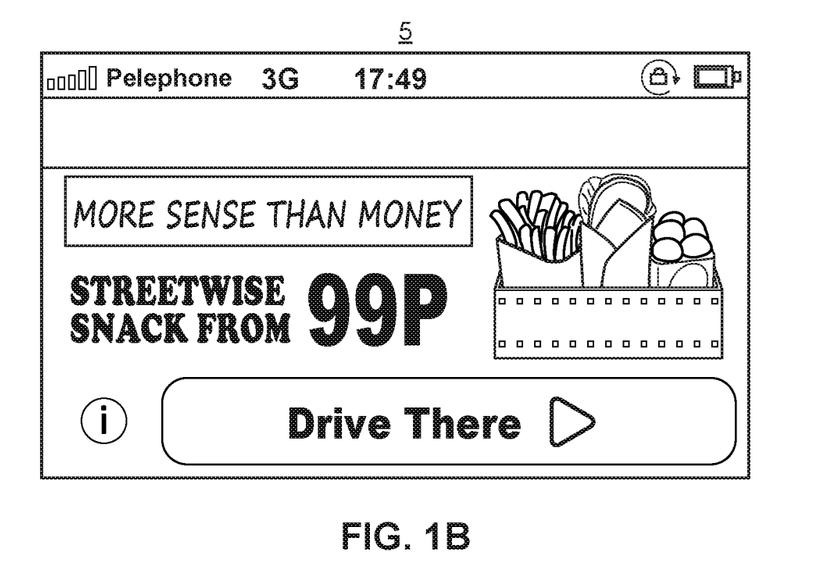
FIG. 1B is an example takeover presented on a map display of a mapping application.

The user may be exposed to a takeover when the user is displaying a mapping application, is within a threshold distance of an organization location or is travelling on a route having at least one waypoint within a threshold distance of the organization location, is stopped or below a threshold speed, and/or meets certain targeting parameters specified by the organization (e.g., a destination location, a starting location, a cellular carrier, a route length, etc.). An example takeover 5 is shown in FIG. 1B. In some embodiments, the takeover 5 may overlay a map display when the impression eligibility requirements for the takeover 5 are met. For example, when the user comes to a stop and is within a threshold distance of the organization corresponding to the takeover 5 or when the user comes to a stop and is travelling or about to travel on a route having at least one waypoint within a threshold distance of the organization corresponding to the takeover 5, the takeover 5 may replace the map display on the user interface of a user's client device for a threshold period of time. The takeover 5 may include an advertisement for the organization and in some embodiments, a user control for providing navigation directions to the organization location.

Thus, for each fake location the impression generation system determines the number of users who would meet the impression eligibility requirements for the type of location identifier to be displayed, if the fake location were an organization location. A statistical model is generated based on the number of users who would meet the impression eligibility requirements at each of the fake locations. Then when an organization requests impression data for one or more organization locations, the impression generation system applies characteristics of the request to the statistical model to determine an impression metric for the organization. The impression metric may be an estimate of the number of users who will meet the impression eligibility requirements for a requested type of identifier (e.g., the number of users who will be displaying map data within a threshold distance of the organization locations) and will therefore display the identifier via the mapping application. The impression metric may then be provided to a client device of the organization. In this manner, the organization may be provided with an estimate of a maximum number of identifiers, which may be advertisements, that may be displayed to mapping application users over a particular time period. The organization may then determine the amount of advertising to purchase based on this estimate.

The statistical model may be updated continuously or periodically (e.g., once a month, once a week, once a day, once an hour, once a minute, etc.) to provide accurate estimates in real-time or at least near real-time to the organization.

One example embodiment of the techniques of this disclosure is a method for providing an impression metric for locations associated with at least one organization on a map display. The method includes selecting a set of geographic locations within a geographic area, and for each geographic location in the set of the geographic locations, determining a number of users displaying map data while meeting impression eligibility requirements for the geographic location. The method further includes generating a statistical model of impression data based on the number of users displaying map data while meeting the impression eligibility requirements for each geographic location in the set to estimate a number of users who will be displaying map data while meeting the impression eligibility requirements for one or more dispersed geographic locations within a predetermined time interval, obtaining a request for impression data for displaying map content indicative of one or more locations associated with an organization over a particular time interval and applying data associated with the request including the one or more organization locations to the statistical model to estimate an impression metric for the one or more organization locations during the particular time interval, the impression metric indicative of a number of users who will be displaying map data while meeting the impression eligibility requirements for the one or more organization locations and providing an indicator of the impression metric for display to a user within the organization. Additionally, the method includes updating the statistical model based on an additional determination of the number of users displaying map data while meeting the impression eligibility requirements for each geographic location to train the statistical model for subsequent use.

Another example embodiment is a computing device for providing an impression metric for locations associated with at least one organization on a map display, where the computing device includes one or more processors and a non-transitory computer-readable memory coupled to the one or more processors and storing thereon instructions. The instructions, when executed by the one or more processors, cause the computing device to select a set of geographic locations within a geographic area, and for each geographic location in the set of the geographic locations, determine a number of users displaying map data while meeting impression eligibility requirements for the geographic location. The instructions further cause computing device to generate a statistical model of impression data based on the number of users displaying map data while meeting the impression eligibility requirements for each geographic location in the set to estimate a number of users who will be displaying map data within the threshold distance of one or more dispersed geographic locations within a predetermined time interval, obtain a request for impression data for displaying map content indicative of one or more locations associated with an organization over a particular time interval, and apply data associated with the request including the one or more organization locations to the statistical model to estimate an impression metric for the one or more organization locations during the particular time interval, the impression metric indicative of a number of users who will be displaying map data while meeting the impression eligibility requirements for the one or more organization locations. Additionally, the instructions cause the computing device to provide an indicator of the impression metric for display to a user within the organization and update the statistical model based on an additional determination of the number of users displaying map data while meeting the impression eligibility requirements for each geographic location to train the statistical model for subsequent use.

Yet another example embodiment is a non-transitory computer-readable medium storing instructions for providing an impression metric. The non-transitory computer-readable memory is coupled to one or more processors in a computing device and storing thereon instructions. The instructions, when executed by the one or more processors, cause the one or more processors to select a set of geographic locations within a geographic area, and for each geographic location in the set of the geographic locations, determine a number of users displaying map data while meeting impression eligibility requirements for the geographic location. The instructions further cause the one or more processors to generate a statistical model of impression data based on the number of users displaying map data while meeting the impression eligibility requirements for each geographic location in the set to estimate a number of users who will be displaying map data within the threshold distance of one or more dispersed geographic locations within a predetermined time interval, obtain a request for impression data for displaying map content indicative of one or more locations associated with an organization over a particular time interval, and apply data associated with the request including the one or more organization locations to the statistical model to estimate an impression metric for the one or more organization locations during the particular time interval, the impression metric indicative of a number of users who will be displaying map data while meeting the impression eligibility requirements for the one or more organization locations. Additionally, the instructions cause the one or more processors to provide an indicator of the impression metric for display to a user within the organization and update the statistical model based on an additional determination of the number of users displaying map data while meeting the impression eligibility requirements for each geographic location to train the statistical model for subsequent use.

DETAILED DESCRIPTION

Overview

An impression generation system of this disclosure can be implemented in one or more servers and/or client devices to estimate an impression metric for an organization and thus a number of location based content items or features for the organization to purchase over a particular time period.

In one aspect, a server generates a statistical model using machine learning techniques for estimating an impression metric for an organization based on training data. The training data may be obtained by randomly selecting a set of geographic locations within a geographic area ("fake" locations that do not necessary correspond to an organization). For each fake location, the server identifies a number of users within a threshold distance of the fake location who are utilizing a mapping application. For example, users of client devices may select an option to share location data and/or other user data while utilizing the mapping application. Accordingly, the server may obtain the users' locations in addition to other user information that the user allows the server to obtain.

If the fake location corresponded to an organization, each of users within the threshold distance of the fake location who are utilizing the mapping application would receive a displayed identifier for the organization. Thus, the number of users within a threshold distance of the fake location who are utilizing a mapping application can be applied to estimate the number of users within a threshold distance of an organization location who are utilizing a mapping application, and therefore the number of impressions for the organization.

The statistical model may then be generated using machine learning techniques. For example, the statistical model is generated by performing a statistical analysis of the training data relating to the number of users within a threshold distance of each fake location who are utilizing a mapping application. Such model is capable of being continuously trained with current data relating to the set of fake locations.

When an organization requests an estimate on a number of impressions over a particular time period via an organization or advertiser computing device, requirements provided by the requesting organization (e.g., specific organization locations, targeting parameters, etc.) are applied to the statistical model as input. Given that location-specific data relating to a number of users for a particular location is already available, the statistical model can be used to estimate the number of impressions for the organization based on the number users within the threshold distance of the fake locations, in combination with any further requirements that are included in the request. This reduces the amount of time as well as the amount of storage space and calculation complexity required to predict such impression metrics—as known location specific geometrics do not need to be regenerated.

In addition to this, given that the training data is periodically and/or continuously collected, the statistical model is up to date and refreshed on a continuous and real-time basis.

Therefore, the statistical model provides more flexibility to impression prediction as it allows for tailor-made predictions. Additional custom or targeting parameters such as speed, particular times of the day, a specific route or indeed a combination of such targeting parameters can be applied easily. Thus, the use of the statistical model for predicting impression metrics for determining the number of identifiers an organization will display provides for a seamless and scalable technique.

Example Hardware and Software Components

Figure 1C:
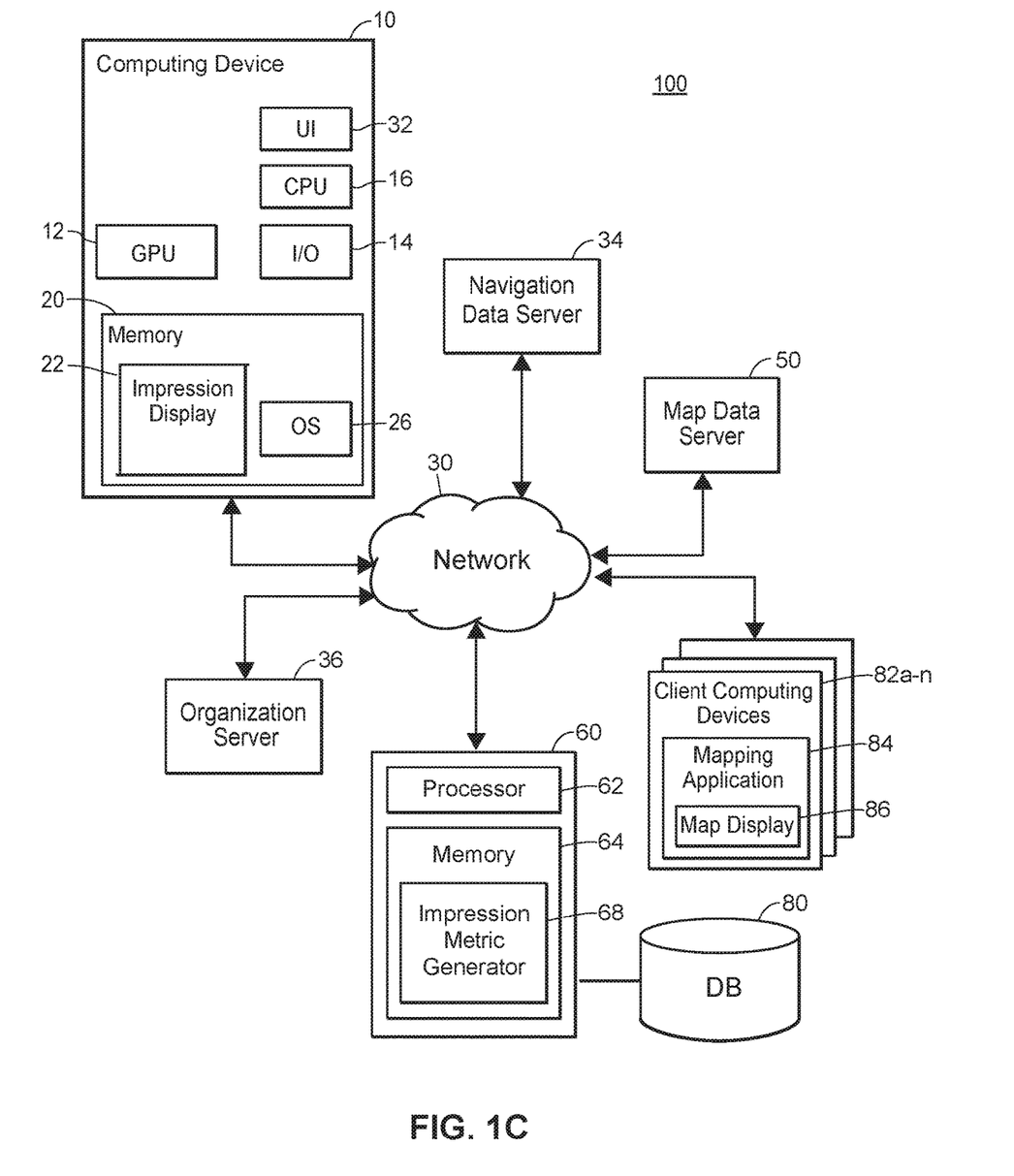
FIG. 1C is a block diagram of an example system in which techniques for estimating an impression metric for an organization using machine learning techniques can be implemented.

Referring to FIG. 1C, an example communication system 100 in which an impression generation system can be implemented includes a requesting computing device, which may be an organization/advertiser/customer computing device 10 and several client devices 82*a-n*, such as a computing device configured to execute a geographic application 84, which also can be referred to as "mapping application 84." Depending on the implementation, the application 84 can display an interactive digital map, request and receive routing data to provide driving, walking, or other navigation directions, provide various geolocated content, etc. Each of the client devices 82*a-n* may be operated by users displaying digital maps while navigating to various locations.

In addition to the computing device 10 and the client devices 82*a-n*, the communication system 100 includes a server device 60 configured to provide an impression metric to the computing device 10. The server device 60 can be communicatively coupled to a database 80 that stores, in an example implementation, a statistical model for estimating the impression metric in addition to training data for training the statistical model. For each of a randomly selected set of geographic locations in a geographic area ("fake" locations), the training data may include user data for each of the users displaying map data within a threshold distance of the geographic location. For example, for branded pins the training data may include user data for each user displaying map data within a threshold distance of the geographic location such that the geographic location is presented on a map display of the user's client device 82*a-n*. For takeovers, the training data may include user data for each user displaying map data within a threshold distance of the geographic location or travelling on a route having at least one waypoint within a threshold distance of the geographic location while stopped. In the embodiments described below, the content items for display which include branded pins, takeovers and media advertisements are herein referred to as advertisements, only for ease of reference. It is to be understood that all location based visual identifiers that are capable of being displayed on a mapping application are intended by this term.

The user data may include location information such as indications of the map tiles displayed on client device 82*a-n* (e.g., geographic coordinates, s2 cells, etc.) and the zoom level at which the map is presented on the client device 82*a-n*. The user data may also include a current time at which the map display is presented, a current speed of the user, route information for the user (e.g., whether the user is travelling home or to work, a distance of the route, points of interest (POIs) along the route, etc.), or any other suitable information. The user data is described in further detail below with reference to FIG. 2A.

In addition to user data, the database 80 may also store location data for the various locations which may be randomly selected by the impression generation system. The location data may include an indication of a map tile (e.g., geographic coordinates, s2 cells, etc.), a radius for the map tile, population information for the area represented by the map tile, traffic information for the area presented by the map tile, etc. The location data is described in further detail below with reference to FIG. 2B.

More generally, the server device 60 can communicate with one or several databases that store any type of suitable geospatial information or information that can be linked to a geographic context, such as coupons or offers. The communication system 100 also can include a navigation data server 34 that provides driving, walking, biking, or public transit directions, for example. Further, the communication system 100 can include a map data server 50 that provides map data to the server device 60 for generating a map display. Still further, the communication system 100 can include an organization server 36 that receives and transmits data related to a particular organization. For example, the organization server 36 may provide map content, such as takeovers, offers, branded pins, etc. to the server device 60. The devices operating in the communication system 100 can be interconnected via a communication network 30.

In various implementations, the computing device 10 may be a smartphone or a tablet computer. The computing device 10 may include a memory 20, one or more processors (CPUs) 16, a graphics processing unit (GPU) 12, an I/O module 14, and a user interface (UI) 32. The memory 20 can be a non-transitory memory and can include one or several suitable memory modules, such as random access memory (RAM), read-only memory (ROM), flash memory, other types of persistent memory, etc. The I/O module 14 may be a touch screen, for example. In various implementations, the computing device 10 can include fewer components than illustrated in FIG. 1C or conversely, additional components. In other embodiments, the computing device 10 may be any suitable portable or non-portable computing device. For example, the computing device 10 may be a laptop computer, a desktop computer, a wearable device such as a smart watch or smart glasses, etc.

The memory 20 stores an operating system (OS) 26, which can be any type of suitable mobile or general-purpose operating system. The OS 26 can include application programming interface (API) functions that allow applications to retrieve sensor readings. For example, a software application configured to execute on the computing device 10 can include instructions that invoke an OS 26 API for retrieving a current location of the computing device 10 at that instant. The API can also return a quantitative indication of how certain the API is of the estimate (e.g., as a percentage).

The memory 20 also stores an impression display 22, which is configured to receive a request for an impression metric for an organization and to display the impression metric indicative of an estimate of a number of advertisements for the organization that will be presented on map displays of users' client devices 82a-n over a specified period of time. The impression display 22 may provide the request to the server device 60 and receive the impression metric from the server device 60. In some embodiments, the organization itself provides the request and receives the impression metric. In other embodiments, an advertiser selling advertisements to the organization provides the request on behalf of the organization, receives the impression metric, and uses the impression metric to recommend a number of advertisements for the organization to purchase.

In some embodiments, the request may include indications of each of the locations for the organization, a time period for the advertising campaign, a type of advertisement for the advertising campaign (e.g., branded pins, takeover ads, etc.), other advertising criteria such as targeting parameters, etc.

As mentioned above, each client device 82a-n may be operated by a user displaying map data. Each of the client devices 82a-n may be a smartphone or a tablet computer and may have one or several sensors 19. Additionally, each client device 82a-n may include a memory that stores an operating system (OS) and a mapping application 84 which is configured to generate interactive digital maps and/or perform other geographic functions, as indicated above. The mapping application 84 can receive map data in a raster (e.g., bitmap) or non-raster (e.g., vector graphics) format from the map data server 50 and present the map data via a map display 86. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The mapping application 84 also can display driving, walking, or transit directions, and in general provide functions related to geography, geolocation, navigation, etc. via the map display 86.

It is noted that although FIG. 1C illustrates the mapping application 84 as a standalone application, the functionality of the mapping application 84 also can be provided in the form of an online service accessible via a web browser executing on the client device 82a-n, as a plug-in or extension for another software application executing on the client device 82a-n, etc. The mapping application 84 generally can be provided in different versions for different respective operating systems. For example, the maker of the client device 82a-n can provide a Software Development Kit (SDK) including the mapping application 84 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up an impression metric generator 68, which can generate a statistical model for estimating an impression metric for an organization. The impression metric generator may also receive a request for impression data for an organization and apply information from the request to the statistical model to determine an impression metric for the organization that is displayed by the impression display 22 of the computing device 10.

The impression metric generator 68 and the impression display 22 can operate as components of an impression generation system. Alternatively, the impression generation system can include only server-side components and simply provide the impression display 22 with instructions to display an impression metric. In other words, impression generation techniques in these embodiments can be implemented transparently to the impression display 22. As another alternative, the entire functionality of the impression metric generator 68 can be implemented in the impression display 22.

For simplicity, FIG. 1C illustrates the server device 60 as only one instance of a server. However, the server device 60 according to some implementations includes a group of one or more server devices, each equipped with one or more processors and capable of operating independently of the other server devices. Server devices operating in such a group can process requests from the computing device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the impression display 22 operating in the computing device 10 receives and transmits data to the server device 60. Thus, in one example, the computing device 10 may transmit a communication to the impression metric generator 68 (implemented in the server device 60) requesting impression data for an organization. The request may specify the locations that correspond to the organization, a type of advertisement (e.g., branded pins or takeovers), a time period for the advertising campaign, and/or other advertising criteria such as targeting parameters. Accordingly, the impression metric generator 68 may apply the data included in the request to a statistical model for estimating an impression metric. For example, the organization may specify that the advertising campaign will last for 1 month. As a result, the impression metric generator 68 may estimate a number of impressions for the organization over a 1 month time period.

In some embodiments, advertising criteria such as targeting parameters may be used to filter the training data used to generate the statistical model. Targeting parameters may include parameters that specify particular characteristics of the eligible users. For example, targeting parameters may include a time of day, a starting location, a destination location, a cellular carrier, a route length, a language, an operating system of a user's client device, a category of interest, or whether the destination location is the user's home or place of business.

Accordingly, the number of impressions for the organization may be estimated based on a modified statistical model. For example, the impression metric generator 68 may create the statistical model based on each of the users displaying map data within a threshold distance of each of the fake locations. When the organization includes a time of day targeting parameter in the request of 4-6 p.m., the training data may be filtered to include only those users displaying map data within a threshold distance of each fake location between 4 and 6 p.m. The statistical model may be adjusted accordingly to account for those particular users.

In any event, the impression metric generator 68 may provide the impression metric for display on the computing device 10. The impression display 22 may then present the impression metric on the user interface 32 of the computing device 10. In this manner, the organization may use the impression metric to determine an appropriate amount of advertising to purchase for a particular advertising campaign.

To generate the statistical model for estimating an impression metric, the impression metric generator 68 may randomly select a set of geographic locations within a geographic area as fake locations. In some embodiments, the geographic area may be the entire world and geographic locations may be randomly selected throughout the entire world. In other embodiments, the geographic area may be a continent, a country, a state, a city, etc. The impression metric generator 68 may then divide the geographic area into several geographic regions having a particular radius (e.g., 70 km). The geographic regions may correspond to map tiles in the mapping application 84 or s2 cells. Then the impression metric generator 68 may randomly select at least one geographic location within each of the geographic regions. For example, the United States may be divided into geographic regions corresponding to each of the 50 states. The impression metric generator 68 may randomly select a geographic location with each of the 50 states. In this manner, the randomly selected geographic locations are dispersed across the geographic area to prevent the geographic locations from being within a minimum threshold distance of each other (e.g., 10 km).

In some embodiments, the impression metric generator 68 may determine the number of users displaying map data within each geographic region. When the number of users displaying map data exceeds a threshold number for a geographic region, the geographic region may be subdivided into geographic subregions. Then at least one geographic location may be randomly selected within each of the geographic subregions. For example, the state of California may include a large number of users. Accordingly, the impression metric generator 68 may subdivide the state of California into geographic regions corresponding to cities in California, such as San Francisco, Los Angeles, San Diego, Sacramento, etc. This process may be repeated until the threshold number of users displaying map data within a geographic region or subregion does not exceed the threshold number.

For each selected fake location, the impression metric generator 68 may determine the number of users displaying map data within a threshold distance of the fake location. The threshold distance may depend on the zoom level at which map data is being displayed, such that the map display includes the fake location. In other embodiments, the threshold distance may be based on a threshold radius surrounding an organization location for displaying takeovers. Users who select an option to share location data and/or other user data may transmit their current locations, the geographic areas and/or zoom levels presented on the map displays 86 of the mapping applications 84 on their client devices 82*a-n*, a session identifier, and/or other user data. The user data along with location data for the geographic locations may be provided as training data for generating the statistical model using machine learning techniques. In some embodiments, separate statistical models may be generated for each type of advertisement. For example, one statistical model may be generated for branded pins and another statistical model may be generated for takeovers. The statistical model for branded pins may be based on the number of users displaying each fake location on their respective map displays to meet the impression eligibility requirements for a branded pin. The statistical model for takeovers may be based on the number of users displaying map data and within a threshold radius of or travelling on a route having at least one waypoint within a threshold distance of each fake location to meet the impression eligibility requirements for a takeover. Example user data and location data are illustrated in FIGS. 2A and 2B, respectively.

Example Training Data for Generating the Statistical Model

Figure 2A:
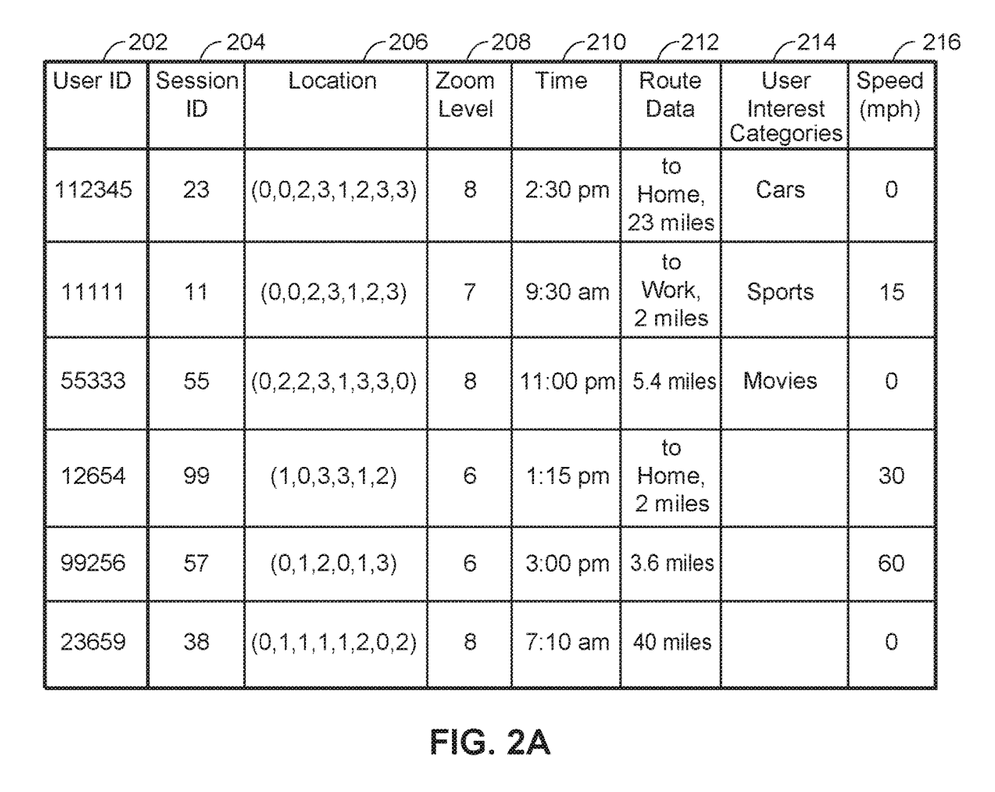
FIG. 2A is an example user data table which the impression generation system of FIG. 1C can utilize to generate a statistical model for estimating an impression metric for an organization.
Figure 2B:
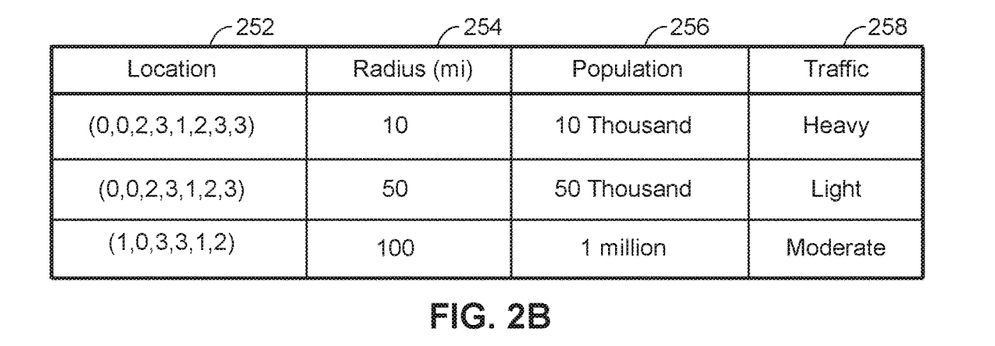
FIG. 2B is an example location data table which the impression generation system of FIG. 1C can utilize to estimate an impression metric for an organization.

FIG. 2A illustrates example user data 200 that may be used as training data for generating the statistical model. In some embodiments, the user data 200 may be stored in the database 80. The user data 200 may include a user identifier (user ID) 202 for a user displaying map data on a client device 82*a-n*. The user data 200 may also include a session identifier (session ID) 204 for a particular session between logging in and logging out or opening and closing the mapping application 84. Additionally, the user data 200 may include one or more locations 206 being displayed on the map display 86, the zoom level 208 of the map display 86, and the time 210 at which the locations are being displayed. The locations 206 may be represented by one or more s2 cells indicative of map tiles presented on the map display 86, geographic coordinates defining the boundaries of the map display 86, or in any other suitable manner. For example, the s2 cell representing the world may be (0), the s2 cell representing a northwest quadrant of the world may be (0,0), the s2 cell representing a northeast quadrant of the world may be (0, 1), the s2 cell representing the southwest quadrant may be (0,2), and the s2 cell representing the southeast quadrant may be (0,3). For each s2 cell that represents a portion of a larger s2 cell, a first portion of the s2 cell may be the same as the larger s2 cell and a second portion of the s2 cell may be based on the location of the s2 cell with respect to the larger s2 cell. For example, an s2 cell which represents the United States may include a first portion (0,0) which is the same as the northwest quadrant of the world following by a second portion (1,1) for example, indicating the location of the United States within the northwest quadrant.

Furthermore, the user data 200 may include route data 212 for a route being traversed by the user. For example, the route data may include a starting location for the route, a destination location for the route, whether the route is to or from a point of interest such as the user's home or work, the distance of the route, etc. The user data 200 may also include categories of interest 214 identified by the user, a speed of a vehicle transporting the user 216, and any other suitable user data that may be used to generate and/or filter the statistical model for estimating an impression metric. Additional user data may include the operating system of the user's client device 82a-n, a language of the client device 82a-n, etc.

When generating a statistical model for branded pins, the impression metric generator 68 may identify, from the user data 200, each of the users 202 displaying locations 206 that include one of the fake locations. For each of the fake locations, the impression metric generator 68 may then determine the number of eligible users (e.g., users who meet the impression eligibility requirements for branded pins, such as displaying the fake location) over a particular time period. In some embodiments, the statistical model may be based on a linear regression analysis and a linear equation may be generated as a function of the number of users displaying the fake location over time. For example, for one of the fake locations, time may be an independent variable and the total number of users displaying the fake location may be a dependent variable. Using the user data 200, the impression metric generator 68 may generate a statistical model as an equation that most closely approximates the number of users displaying the fake location over time. The statistical models for each fake location may be combined in any suitable manner to generate a statistical model that most closely approximates the number of users displaying the several fake locations over time. For example, for a particular time (e.g., t=2 hours) the number of users displaying each of the fake locations may be averaged. In another example, a weighted average may be determined where some fake locations are weighted higher than others. For example, as described in more detail below with reference to FIG. 2B, user data for fake locations having similar properties to a requested organization location may be weighted higher.

When generating a statistical model for takeovers, the impression metric generator 68 may identify, from the user data 200, each of the users 202 displaying locations 206 that are within a threshold radius of one of the fake locations or travelling on a route having at least one waypoint within a threshold radius of one of the fake locations and travelling at zero speed 216 or below a threshold speed (eligible users). For each of the fake locations, the impression metric generator 68 may then determine the number of eligible users (e.g., users who meet the impression eligibility requirements for takeovers) for the fake location over a particular time period. In some embodiments, the statistical model may be based on a linear regression analysis and a linear equation may be generated as a function of the number of eligible users for the fake location over time. For example, for one of the fake locations, time may be an independent variable and the total number of eligible users for the fake location may be a dependent variable. Using the user data 200, the impression metric generator 68 may generate a statistical model as an equation that most closely approximates the number of eligible users for the fake location over time. The statistical models for each fake location may be combined in any suitable manner to generate a statistical model that most closely approximates the number of eligible users for the several fake locations over time. For example, for a particular time (e.g., t=2 hours) the number of eligible users displaying for each fake location may be averaged. In another example, a weighted average may be determined where some fake locations are weighted higher than others. For example, as described in more detail below with reference to FIG. 2B, user data for fake locations having similar properties to requested organization locations may be weighted higher.

When targeting parameters are provided for the takeovers, the impression metric generator 68 may filter out users 202 from the user data 200 that do not meet the targeting parameters. For example, when the targeting parameter is users on their way home or to work, the impression metric generator 68 may retrieve the route data 212 and filter out users 202 who are not traveling to their home or work locations. Then the impression metric generator 68 may generate the statistical model including eligible users for fake locations that are traveling home or to work.

In some embodiments, an ordinary least squares method may be used to minimize the difference between the value of a predicted number of users using the statistical model and the actual number of users displaying each of the fake locations from the user data 200. Additionally, the differences between the values of each predicted number of users ($\hat{y}_i$) using the statistical model and actual number of users displaying each of the fake locations ($y_i$) in the user data 200 may be aggregated and/or combined in any suitable manner to determine a mean square error (MSE) of the regression. The MSE may then be used to determine a standard error or standard deviation ($\sigma_\epsilon$) in the statistical model, which may in turn be used to create confidence intervals.

As mentioned above, the impression metric generator 68 may weight fake locations higher that are similar to organization locations from the requesting organization. For example, location data 250 as shown in FIG. 2B for several locations throughout the world may be stored in the database 80. The locations 252 may be at varying levels of detail. For example, the stored locations 252 may be countries, states, cities, neighborhoods, etc. The locations 252 may be identified in any suitable manner such as by a set of geographic coordinates that describe the boundaries of a location, an s2 cell, etc. For each of the locations 252, the location data 250 may include a radius 254 indicating a size of the geographic area of the location 252, a population 256 of the location 252, and an amount of traffic at the location 258. Additional or alternative location data 250 may also be included.

In any event, the location data 250 may be used to determine fake locations having a similar amount of people and/or traffic as the organization locations or the specified area surrounding the organization locations. For example, the impression metric generator 68 may compare geographic areas around each of the organization locations to the locations 252 in the location data 250. The impression metric generator 68 may determine an amount of similarity between a geographic area surrounding an organization location to a geographic area surrounding a fake location based on the difference in population, traffic, and/or other properties of the location related to impressions. In some embodiments, each of the geographic area surrounding the fake locations may be assigned a similarity score to the geographic area surrounding an organization location. Then the user data for fake locations having the highest similarity scores may be weighted highest when generating the statistical model. For example, when the organization location is in a densely populated city, the number of users displaying map data in the densely populated city is more likely to be accurately estimated based on the number of users displaying map data in another densely populated city than in a lightly populated rural area. However, this is merely on exemplary embodiment. In other embodiments, user data from each of the fake locations may be weighted equally.

Example Statistical Model

Figure 3:
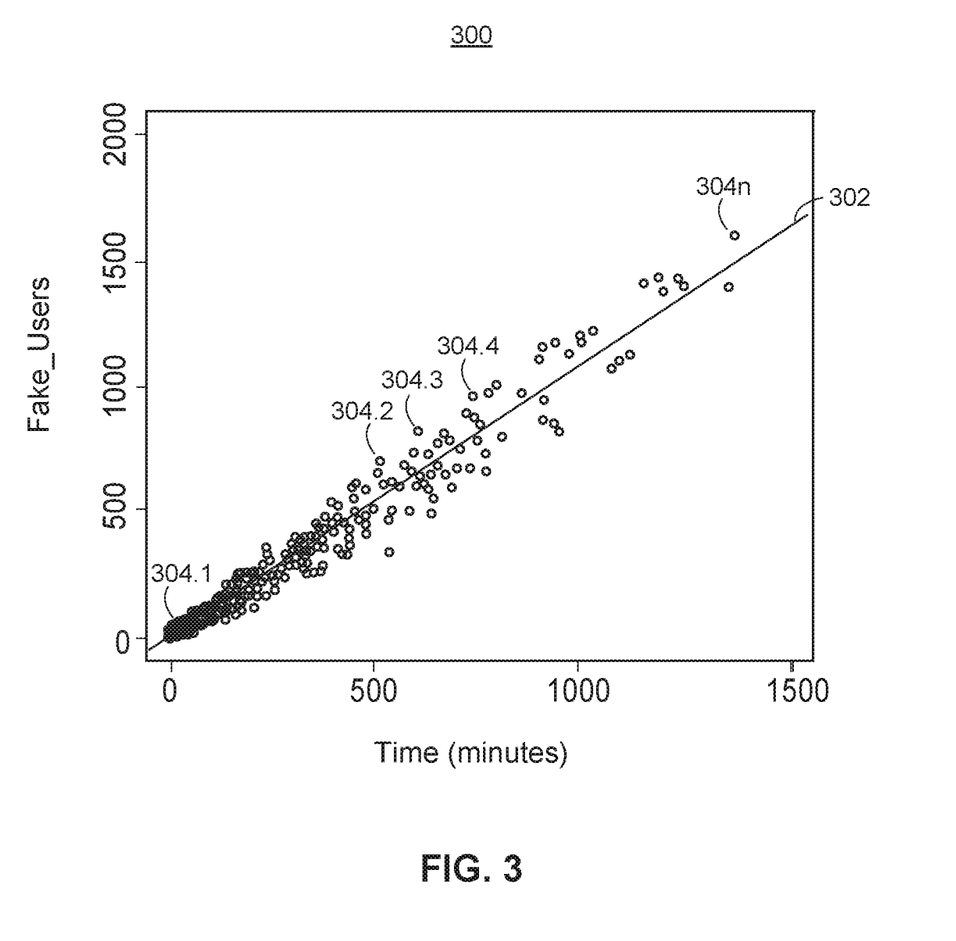
FIG. 3 is an example graphical representation including a statistical model generated by the impression generation system to estimate an impression metric for an organization.

FIG. 3 illustrates an example graphical representation 300 including a statistical model 302 for estimating an impression metric for an organization. The graphical representation 300 and/or statistical model 302 may be generated by the impression metric generator 68. In some embodiments, the statistical model 302 may be generated using various machine learning techniques such as a regression analysis (e.g., a logistic regression, linear regression, or polynomial regression), decisions trees, random forests, boosting, neural networks, support vector machines, Bayesian networks, etc. While the statistical model 302 in FIG. 3 is a linear regression model, this is merely one exemplary model for ease of illustration only. Any other suitable statistical model may be generated using any other suitable machine learning technique, such as the machine learning techniques mentioned above.

In any event, the statistical model 302 includes a linear equation for estimating a number of eligible users for displaying advertisements as a function of time. The linear equation may be determined based on the number of eligible users for fake locations (fake users) at various points in time. As mentioned above, when the statistical model 302 is generated for branded pins, impression eligibility requirements may include those users displaying the fake locations. When the statistical model 302 is generated for takeovers, impression eligibility requirements may include those users displaying map data within a threshold distance or radius of the fake locations or travelling on a route having at least one waypoint along the route within a threshold distance or radius of the fake locations while travelling below a threshold speed (e.g., 0 mph). For example, if a user is driving home from work and on the route there is a Joe's Coffee Shop location right off a highway that the user is directed to travel on, the user may be eligible for the takeover from the time she begins navigating and the vehicle is stopped even when the user is far away from the Joe's Coffee Shop at her starting location.

Additionally, when the statistical model 302 is generated for takeovers, impression eligibility requirements may also include meeting certain targeting parameters. Thus, otherwise eligible users who do not meet the specified targeting parameters may be filtered out from the analysis. Targeting parameters may include a time of day, a starting location, a destination location, a cellular carrier, a route length, a language, an operating system of a user's client device, a category of interest, or whether the destination location is the user's home or place of business.

The graphical representation 300 may include several data points 304.1-304.n, each representing the total number of eligible users for fake locations as a function of time. In some embodiments, each data point 304.1-304.n may be an average or a weighted average of the total number of eligible users for each fake location at a particular point in time. In other embodiments, the data points may include a separate data point indicating the total number of eligible users at a particular point in time at each of the fake locations. In some embodiments, the total number of eligible users for a fake location at time $t_1$ indicates the total number of eligible users from the beginning of the measurement ($t_0$) until $t_1$. For example, 500 eligible fake users at a fake location at time $t_1$ indicates that from $t_0$ up to $t_1$ 500 fake users were eligible to receive an impression for the fake location.

The statistical model 302 may be generated by using an ordinary least squares method to minimize the difference between the value of a predicted number of users from the statistical model 302 and the data points 304.1-304.n. Additionally, the differences between the values of each predicted number of users ($\hat{y}_i$) from the statistical model 302 and the data points 304.1-304.n ($y_i$) may be aggregated and/or combined in any suitable manner to determine a mean square error (MSE) of the regression.

As a result, the impression metric generator 68 generates a statistical model 302 that provides an estimated number of eligible users (impressions) for a particular time period. In some embodiments, the statistical model 302 may be represented by the equation y=mx+b, where m is the slope of the linear equation, b is the y-intercept, x is the length of time for the advertising campaign and y is the estimated number of impressions over the time span. For example, an organization may request an impression metric for a 2 week advertising campaign across five organization locations and the statistical model 302 may be used to determine an estimated number of impressions at each of the organization locations over the 2 week time period. In some embodiments, the impression metric generator 68 may apply the 2 week time period to the statistical model 302 to determine an estimated number of impressions for a single location and multiply the estimated number by the number of organization locations to determine the impression metric. In other embodiments, a different statistical model 302 may be generated for each organization location, for example by weighting user data for fake locations differently based on a similarity score or metric with respect to the organization location.

The statistical model 302 may be updated continuously or periodically (e.g., once a month, once a week, once a day, once an hour, once a minute, etc.) to provide accurate estimates in real-time or at least near real-time to the organization. For example, the impression metric generator 68 may repetitively obtain data for the same fake locations every second, minute, hour, day, etc. for further training. The statistical model 302 is then updated accordingly based on the new data and the updated statistical model 302 may be used in subsequent impression estimates.

When the type of advertisement for an organization advertising campaign is a branded pin, the impression metric generator 68 may apply data from the requested organization to the statistical model 302 for each organization location (e.g., the time period for the advertising campaign, the number of organization locations, identifiers for the organization locations such as geographic coordinates or an address, etc.) to determine individual impression metrics for each organization location. The impression metric generator 68 may also aggregate the individual impression metrics to determine an overall impression metric for the organization. Both the individual impression metrics and the overall impression metric may be provided to the computing device 10 for display to a user within the organization or to an advertiser selling the advertisements to the organization. The individual impression metrics and the overall impression metric may be displayed via the impression display 22 of the computing device 10.

When the type of advertisement for an organization advertising campaign is a takeover, the impression metric generator 68 may apply data from the requested organization to the statistical model 302 for each organization location (e.g., the time period for the advertising campaign, the number of organization locations, identifiers for the organization locations such as geographic coordinates or an address, etc.) to determine a single impression metric for the organization. The impression metric may be provided to the computing device 10 for display to a user within the organization or to an advertiser selling the advertisements to the organization. The impression metric may be displayed via the impression display 22 of the computing device 10.

In some embodiments, the organization may include targeting parameters in the request. Accordingly, data from otherwise eligible users who do not meet the targeting parameters may be filtered out from the analysis. As a result, the statistical model may be generated based on only those eligible users who meet the targeting parameters. This may be determined by comparing the user data 200 as shown in FIG. 2 for the eligible users to the targeting parameters. Then the statistical model may be adjusted based on the remaining eligible users for the fake locations.

In an exemplary scenario, Robert's Seafood is interested in a 2 week takeover campaign at each of its 5 locations. To determine the amount of advertising to purchase, Robert provides a request for impression data via his computing device. In the request, Robert provides the length of the advertising campaign (2 weeks), the number of locations (5), addresses for each of the locations, and the type of advertisement (takeovers). The request is then provided to the server device 60 which applies the data from the request to a statistical model for estimating an impression metric.

Accordingly, the server device estimates 3,000 impressions over the 2 week span and provides the estimate to Robert's computing device. At a cost per thousand (CPM) impressions of $1000, Robert estimates the advertising campaign will cost him $3,000. To decrease his cost, Robert enters targeting parameters into the request. For example, the targeting parameters may specify that only drivers during rush hour on their way home from work (e.g., between 4 and 6 p.m.) will be eligible to receive the takeover. As a result, the server device 60 applies the targeting parameters to adjust the statistical model and estimate 500 impressions over the 2 week span. Accordingly, Robert is satisfied with the lower cost estimate of $500 and agrees to participate in the advertising campaign.

Example Method for Providing an Impression Metric

Figure 4:
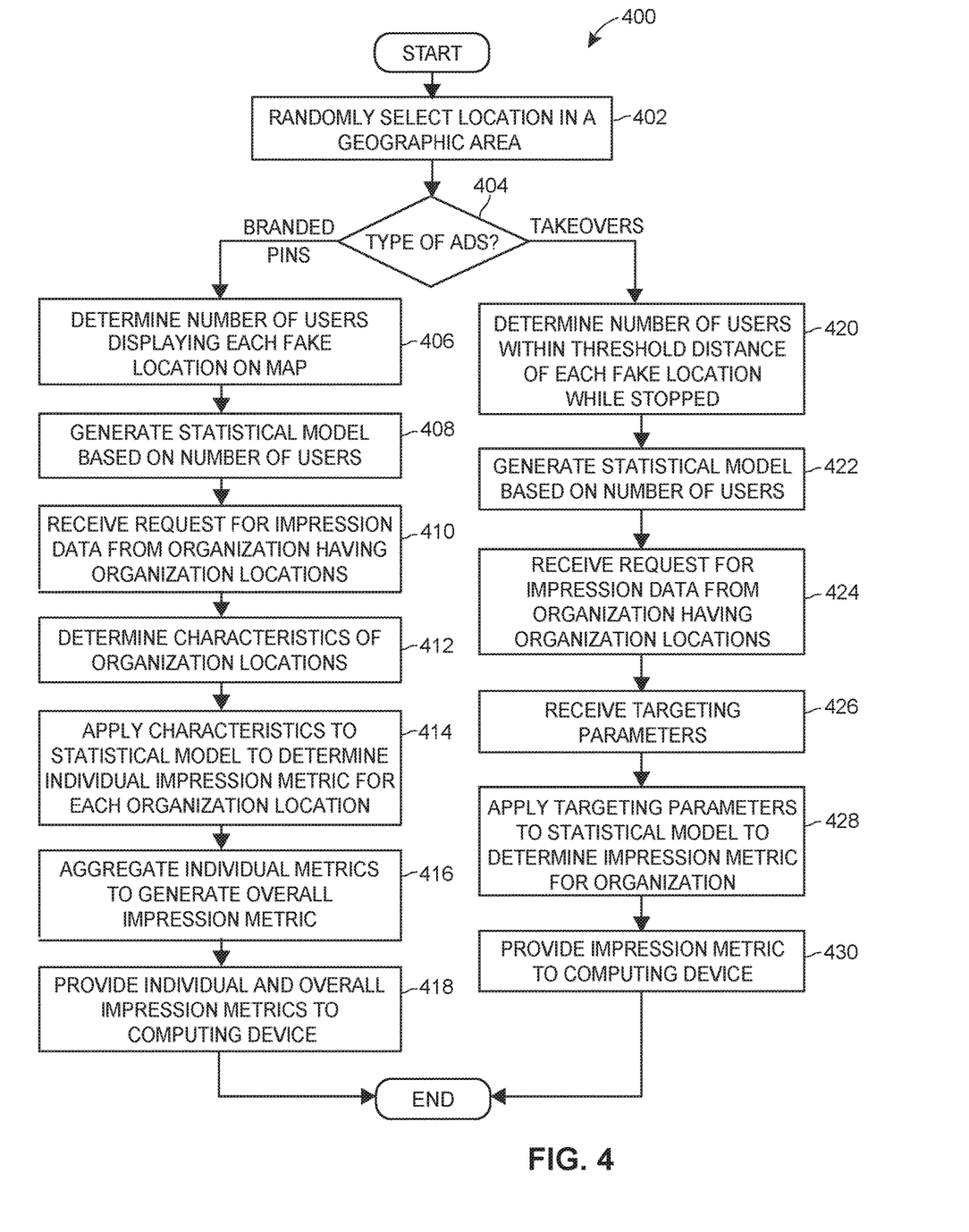
FIG. 4 is a flow diagram of an example method for providing an impression metric for an organization, which can be implemented in a computing device that operates in, or cooperates with, an impression generation system.

FIG. 4 illustrates a flow diagram of an example method 400 for providing an impression metric for an organization. The method can be implemented in a set of instructions stored on a computer-readable memory and executable at one or more processors of the server device 60. For example, the method can be implemented by the impression metric generator 68.

At block 402, a set of geographic locations within a geographic area may be randomly selected as fake locations. In some embodiments, the geographic area may be the entire world and geographic locations may be randomly selected throughout the entire world. In other embodiments, the geographic area may be a continent, a country, a state, a city, etc.

To randomly select the fake locations, the impression metric generator 68 may divide the geographic area into several geographic regions having a particular radius (e.g., 70 km). The geographic regions may correspond to map tiles in the mapping application 84 or s2 cells. Then the impression metric generator 68 may randomly select at least one geographic location within each of the geographic regions. For example, the United States may be divided into geographic regions corresponding to each of the 50 states. The impression metric generator 68 may randomly select a geographic location with each of the 50 states.

In some embodiments, the impression metric generator 68 determines the type of advertisement (block 404) and generates a statistical model of impression data for each type of advertisement (e.g., branded pins and takeovers). In other embodiments, the impression metric generator 68 generates a single statistical model of impression data.

In any event, when the type of advertisement is branded pins, the number of eligible users may be determined for each of the fake locations over a particular time period (block 406). Impression eligibility requirements for branded pins may include those users displaying a particular fake location via the mapping application 84. For example, users may select an option to share location data and/or other user data via their client devices 82*a-n*. When the users are displaying map data via the mapping application 84, user data may be provided to the server device 60, such as the user data 200 as shown in FIG. 2A.

The user data may be training data for generating a statistical model for estimating an impression metric for an organization (block 408). The statistical model may be generated using machine learning techniques, such as a regression analysis (e.g., a logistic regression, linear regression, or polynomial regression), decisions trees, random forests, boosting, neural networks, support vector machines, Bayesian networks, etc. For example, when the statistical model is based on a linear regression a linear equation may be generated as a function of the number of eligible users for the fake location over time. For the fake locations, time may be an independent variable and the total number of eligible users for the fake locations may be a dependent variable.

The impression metric generator 68 may generate a statistical model as an equation that most closely approximates the number of users displaying the fake locations over time. In some embodiments, a statistical model may be generated for each fake location and the statistical models for each fake location may be combined in any suitable manner to generate a statistical model that most closely approximates the number of users displaying the several fake locations over time. For example, for a particular time (e.g., t=2 hours) the number of users displaying each of the fake locations may be averaged. In another example, a weighted average may be determined where some fake locations are weighted higher than others. In this manner, the statistical model is generated based on a single data point for each point in time corresponding to an average or weighted average of the number of users displaying fake locations up to the point in time. In other embodiments, the statistical model may be generated based on multiple data points for the same point in time, where a first data point corresponds to the number of users displaying fake location 1 up to time 1, a second data point corresponds to the number of users displaying fake location 2 up to time 1, a third data point corresponds to the number of users displaying fake location 3 up to time 1, etc. In any event, the statistical model may then be used to estimate the number of users displaying organization locations for a particular organization.

At block 410, the server device 60 may receive a request for impression data for a branded pin advertising campaign from an organization having one or several organization locations. The organization may provide a time period for the advertising campaign (e.g., 1 month), indications of the organization locations to include in the advertising campaign, and any other suitable information.

In some embodiments, the impression metric generator 68 may determine characteristics of each of the organization locations (block 412). For example, as described above, the impression metric generator 68 may identify a population of an organization location, an amount of traffic around the organization location, or any other suitable location information from a location data table such as the location data 250 as shown in FIG. 2B. The characteristics of an organization location may be used to determine fake locations having a similar amount of people and/or traffic as the organization locations or the specified area surrounding the organization locations. For example, the impression metric generator 68 may determine an amount of similarity between a geographic area surrounding an organization location to a geographic area surrounding a fake location based on the difference in population, traffic, and/or other characteristics of the location related to impressions. In some embodiments, each of the geographic areas surrounding the fake locations may be assigned a similarity score to the geographic area surrounding an organization location.

Then, in some embodiments, data for fake locations having a similarity score below a threshold score may be filtered out of the statistical model. In other embodiments, data for fake locations may be weighted according to the similarity score of the corresponding fake location when adjusting the statistical model for the organization. For example, when the organization location is in a densely populated city, the number of users displaying map data in the densely populated city is more likely to be accurately estimated based on the number of users displaying map data in another densely populated city than in a lightly populated rural area. However, this is merely on exemplary embodiment. In other embodiments, user data from each of the fake locations may be weighted equally.

In any event, the characteristics of the organization locations may be applied to the statistical model to filter out data from the statistical model or weight data in the statistical model accordingly to adjust the linear equation, for example. The time period for the advertising campaign may be applied to the adjusted statistical model to determine an individual impression metric for each of the organization locations (block 414). When the statistical model is not adjusted based on characteristics of the organization locations to filter or weight data, the impression metric generator 68 may apply the time period to the statistical model to determine an estimated number of impressions for a single location and multiply the estimated number by the number of organization locations to determine the overall impression metric for the organization (block 416).

When the statistical model is adjusted for each organization location based on the characteristics of the respective organization location, an individual impression metric is determined for each of the organization locations based on the separately adjusted statistical models. Then the individual impression metrics are aggregated and/or combined in any suitable manner to determine an overall impression metric for the organization.

Both the individual impression metrics and the overall impression metric may be provided to the computing device 10 for display to a user within the organization or to an advertiser selling the advertisements to the organization (block 418). In this manner, the organization or advertiser is provided with an estimate of a maximum number of impressions over the time period for the advertising campaign. The organization may then determine the amount of advertising to purchase based on the estimate.

When the type of advertisement is a takeover, the number of eligible users may be determined for each of the fake locations over a particular time period (block 420). Impression eligibility requirements for a takeover may include those users displaying locations within a threshold radius of one of the fake locations via the mapping application 84 or travelling on a route having at least one waypoint within a threshold radius of one of the fake locations and travelling at zero speed or below a threshold speed. For example, users may select an option to share location data and/or other user data via their client devices 82a-n. When the users are displaying map data via the mapping application 84, user data may be provided to the server device 60, such as the user data 200 as shown in FIG. 2A.

The user data may be training data for generating a statistical model for estimating an impression metric for an organization (block 422). The statistical model may be generated using machine learning techniques, such as a regression analysis (e.g., a logistic regression, linear regression, or polynomial regression), decisions trees, random forests, boosting, neural networks, support vector machines, Bayesian networks, etc. For example, when the statistical model is based on a linear regression a linear equation may be generated as a function of the number of eligible users for the fake location over time. For the fake locations, time may be an independent variable and the total number of eligible users for the fake locations may be a dependent variable.

The impression metric generator 68 may generate a statistical model as an equation that most closely approximates the number of users displaying the fake locations over time. In some embodiments, a statistical model may be generated for each fake location and the statistical models for each fake location may be combined in any suitable manner to generate a statistical model that most closely approximates the number of users displaying the several fake locations over time. For example, for a particular time (e.g., t=2 hours) the number of users displaying each of the fake locations may be averaged. In another example, a weighted average may be determined where some fake locations are weighted higher than others. In this manner, the statistical model is generated based on a single data point for each point in time corresponding to an average or weighted average of the number of users displaying fake locations up to the point in time. In other embodiments, the statistical model may be generated based on multiple data points for the same point in time. In any event, the statistical model may then be used to estimate the number of eligible users for a particular organization.

At block 424, the server device 60 may receive a request for impression data for a takeover campaign from an organization having one or several organization locations. The organization may provide a time period for the advertising campaign (e.g., 1 month), indications of the organization locations to include in the advertising campaign, and any other suitable information. In some embodiments, the organization may also provide targeting parameters (block 426) such as a time of day, a starting location, a destination location, a cellular carrier, a route length, a language, an operating system of a user's client device, a category of interest, or whether the destination location is the user's home or place of business.

When targeting parameters are provided, data may be filtered out of the statistical model corresponding to users who do not meet the targeting parameters. For example, when the organization includes a time of day targeting parameter in the request of 4-6 p.m., the training data may be filtered to include only eligible users for the fake locations between 4 and 6 p.m. The statistical model may be adjusted accordingly to account for those particular users. In some embodiments, the impression generation metric 68 may compare the targeting parameters to user data for the users such as the user data 200 as shown in FIG. 2A to filter out users who do not meet the targeting parameters.

In any event, the targeting parameters may be applied to the statistical model to filter out data from the statistical model corresponding to users who do not meet the targeting parameters. Then the time period for the advertising campaign and/or the number of organization locations for the organization may be applied to the adjusted statistical model to determine an impression metric for the organization (block 428).

The impression metric may then be provided to the computing device 10 for display to a user within the organization or to an advertiser selling the advertisements to the organization (block 430). In this manner, the organization or advertiser is provided with an estimate of a maximum number of impressions over the time period for the advertising campaign. The organization may then determine the amount of advertising to purchase based on the estimate.

In some embodiments, the statistical model may be updated continuously or periodically (e.g., once a month, once a week, once a day, once an hour, once a minute, etc.) to provide accurate estimates in real-time or at least near real-time to the organization. For example, the impression metric generator 68 may repetitively obtain data for the same fake locations every second, minute, hour, day, etc. for further training. The statistical model is then updated accordingly based on the new data and the updated statistical model may be used in subsequent impression estimates.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 400 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The method 400 may be included as part of any backend server (e.g., a map data server, an organization server, or any other type of server computing device, as described herein), client computing device modules of the example environment, for example, or as part of a module that is external to such an environment. Though the Figs. may be described with reference to the other Figs. for ease of explanation, the method 400 can be utilized with other objects and user interfaces. Furthermore, although the explanation above describes steps of the method 400 being performed by specific devices (such as a server device 60), this is done for illustration purposes only. The blocks of the method 400 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the Figs. depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing an impression metric through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing an impression metric for locations associated with at least one organization on a map display, the method comprising:
   randomly selecting, by one or more processors, a set of geographic locations within one or more geographic regions within a geographic area;
   for each geographic location in the set of the geographic locations, determining, by the one or more processors, a number of users displaying map data while meeting impression eligibility requirements for the geographic location based at least in part on location data determined by global positioning system (GPS) sensors in the users' client devices;
   generating, by the one or more processors, a statistical model of impression data based on the number of users displaying map data while meeting the impression eligibility requirements for each geographic location in the set to estimate a number of users who will be displaying map data while meeting the impression eligibility requirements for one or more dispersed geographic locations within a predetermined time interval;
   obtaining, at the one or more processors, a request for impression data for displaying map content indicative of one or more locations associated with an organization over a particular time interval;
   applying, by the one or more processors, data associated with the request including the one or more organization locations to the statistical model to estimate an impression metric for the one or more organization locations during the particular time interval, the impression metric indicative of a number of users who will be displaying map data while meeting the impression eligibility requirements for the one or more organization locations;
   providing, by the one or more processors, an indicator of the impression metric for display to a user within the organization; and
   updating, by the one or more processors, the statistical model based on an additional determination of the number of users displaying map data while meeting the impression eligibility requirements for each geographic location to train the statistical model for subsequent use.

2. The method of claim 1, wherein the impression metric is generated to estimate a number of takeover content items for the organization that will be presented on map displays during the particular time interval and the impression eligibility requirements for the takeover content items include users displaying map data within a threshold distance of the geographic location while the users are not moving or users displaying map data while traveling on a route having at least one waypoint within a threshold distance of the geographic location while not moving.

3. The method of claim 2, wherein the impression eligibility requirements for the takeover content items further include one or more targeting parameters that specify particular characteristics of the users displaying map data, including at least one of: a time of day, a starting location, a destination location, a cellular carrier, a route length, a language, an operating system of a user's client device, a category of interest, or whether the destination location is the user's home or place of business.

4. The method of claim 3, further comprising:
   obtaining, by the one or more processors, the one or more targeting parameters in the request that specify particular characteristics of the users displaying map data;

filtering, by the one or more processors, data in the statistical model to include users that meet the impression eligibility requirements for the takeover content items including the requested one or more targeting parameters; and applying, by the one or more processors, the data associated with the request to the filtered statistical model.

5. The method of claim 1, wherein the impression metric is generated to estimate a number of branded pins indicative of organization locations that will be presented on map displays during the particular time interval, the impression eligibility requirements for the branded pins include users displaying map data of the geographic location, and further comprising:

for each of the plurality of organization locations, applying, by the one or more processors, the organization location to the statistical model to estimate an individual impression metric for the organization location during the particular time interval;

aggregating, by the one or more processors, the individual impression metrics to estimate a total impression metric for the organization; and providing, by the one or more processors, (i) an indicator of the total impression metric and (ii) a plurality of indicators of each individual impression metric for display to the user within the organization.

6. The method of claim 1, wherein the statistical model is periodically updated by repetitively obtaining the number of users displaying map data at a same geographic location after a predetermined period of time to estimate the impression metric in real-time.

7. The method of claim 1, further comprising:

determining, by the one or more processors, a number of users within each geographic region; and when the number of users within each geographic region exceeds a threshold number, subdividing, by the one or more processors, each of the plurality of geographic regions to a plurality of geographic subregions, wherein the set of geographic locations are selected by randomly selecting at least one geographic location in each of the geographic subregions.

8. The method of claim 1, wherein the statistical model is a linear regression model.

9. A computing device for providing an impression metric for locations associated with at least one organization on a map display, the computing device comprising:

one or more processors; and a non-transitory computer-readable memory coupled to the one or more processors and storing instructions thereon that, when executed by the one or more processors, cause the computing device to:

randomly select a set of geographic locations within one or more geographic regions within a geographic area;

for each geographic location in the set of the geographic locations, determine a number of users displaying map data while meeting impression eligibility requirements for the geographic location based at least in part on location data determined by global positioning system (GPS) sensors in the users' client devices;

generate a statistical model of impression data based on the number of users displaying map data while meeting the impression eligibility requirements for each geographic location in the set to estimate a number of users who will be displaying map data while meeting the impression eligibility requirements for one or more dispersed geographic locations within a predetermined time interval;

obtain a request for impression data for displaying map content indicative of one or more locations associated with an organization over a particular time interval;

apply data associated with the request including the one or more organization locations to the statistical model to estimate an impression metric for the one or more organization locations during the particular time interval, the impression metric indicative of a number of users who will be displaying map data while meeting the impression eligibility requirements for the one or more organization locations;

provide an indicator of the impression metric for display to a user within the organization; and update the statistical model based on an additional determination of the number of users displaying map data while meeting the impression eligibility requirements for each geographic location to train the statistical model for subsequent use.

10. The computing device of claim 9, wherein the impression metric is generated to estimate a number of takeover content items for the organization that will be presented on map displays during the particular time interval and the impression eligibility requirements for the takeover content items include users displaying map data within a threshold distance of the geographic location while the users are not moving or users displaying map data while traveling on a route having at least one waypoint within a threshold distance of the geographic location while the users are not moving.

11. The computing device of claim 10, wherein the impression eligibility requirements for the takeover content items further include one or more targeting parameters that specify particular characteristics of the users displaying map data, including at least one of: a time of day, a starting location, a destination location, a cellular carrier, a route length, a language, an operating system of a user's client device, a category of interest, or whether the destination location is the user's home or place of business.

12. The computing device of claim 11, wherein the instructions further cause the computing device to:

obtain the one or more targeting parameters in the request that specify particular characteristics of the users displaying map data;

filter data in the statistical model to include users that meet the impression eligibility requirements for the takeover content items including the requested one or more targeting parameters; and apply the data associated with the request to the filtered statistical model.

13. The computing device of claim 9, wherein the impression metric is generated to estimate a number of branded pins indicative of organization locations that will be presented on map displays during the particular time interval, the impression eligibility requirements for the branded pins include users displaying map data of the geographic location, and the instructions further cause the computing device to:

for each of the plurality of organization locations, apply the organization location to the statistical model to estimate an individual impression metric for the organization location during the particular time interval;

aggregate the individual impression metrics to estimate a total impression metric for the organization; and provide (i) an indicator of the total impression metric and (ii) a plurality of indicators of each individual impression metric for display to the user within the organization.

14. The computing device of claim 9, wherein the statistical model is periodically updated by repetitively obtaining the number of users displaying map data at a same geographic location after a predetermined period of time to estimate the impression metric in real-time.

15. A non-transitory computer-readable medium storing instructions for providing an impression metric that, when executed by one or more processors in a computing device, cause the one or more processors to:
   randomly select a set of geographic locations within one or more geographic regions within a geographic area;
   for each geographic location in the set of the geographic locations, determine a number of users displaying map data while meeting impression eligibility requirements for the geographic location based at least in part on location data determined by global positioning system (GPS) sensors in the users' client devices;
   generate a statistical model of impression data based on the number of users displaying map data while meeting the impression eligibility requirements for each geographic location in the set to estimate a number of users who will be displaying map data while meeting the impression eligibility requirements for one or more dispersed geographic locations within a predetermined time interval;
   obtain a request for impression data for displaying map content indicative of one or more locations associated with an organization over a particular time interval;
   apply data associated with the request including the one or more organization locations to the statistical model to estimate an impression metric for the one or more organization locations during the particular time interval, the impression metric indicative of a number of users who will be displaying map data while meeting the impression eligibility requirements for the one or more organization locations;
   provide an indicator of the impression metric for display to a user within the organization; and
   update the statistical model based on an additional determination of the number of users displaying map data while meeting the impression eligibility requirements for each geographic location to train the statistical model for subsequent use.

16. The computer-readable medium of claim 15, wherein the impression metric is generated to estimate a number of takeover content items for the organization that will be presented on map displays during the particular time interval and the impression eligibility requirements for the takeover content items include users displaying map data within a threshold distance of the geographic location while the users are not moving or users displaying map data while traveling on a route having at least one waypoint within a threshold distance of the geographic location while the users are not moving.

17. The computer-readable medium of claim 16, wherein the impression eligibility requirements for the takeover content items further include one or more targeting parameters that specify particular characteristics of the users displaying map data, including at least one of: a time of day, a starting location, a destination location, a cellular carrier, a route length, a language, an operating system of a user's client device, a category of interest, or whether the destination location is the user's home or place of business.

18. The computer-readable medium of claim 17, wherein the instructions further cause the computing device to:
   obtain the one or more targeting parameters in the request that specify particular characteristics of the users displaying map data;
   filter data in the statistical model to include users that meet the impression eligibility requirements for the takeover content items including the requested one or more targeting parameters; and
   apply the data associated with the request to the filtered statistical model.

* * * * *